United States Patent Office 3,060,048
Patented Oct. 23, 1962

3,060,048
CHLOROFORM SOLUTION
George H. Smith, Maplewood, Minn., assignor to Minnesota Mining and Manufacturing Company, St. Paul, Minn., a corporation of Delaware
No Drawing. Filed Sept. 26, 1960, Ser. No. 58,184
1 Claim. (Cl. 106—287)

This invention relates to a new and useful chloroform solution of N,N'-bis-ethyleneterephthalamide.

An object of this invention is to teach the novel solution of N,N'-bis-ethyleneterephthalamide which may be manufactured directly in a multiphase process and subsequently utilized directly. This process and the solution of this invention are disclosed in my copending application S.N. 850,330, filed November 2, 1959, of which this application is a continuation-in-part. Application S.N. 850,330 is a continuation-in-part of my prior applications S.N. 645,005, filed March 11, 1957, now abandoned; S.N. 676,400, filed August 5, 1957, now abandoned; S.N. 832,152, filed August 7, 1959; and S.N. 840,255, filed September 16, 1959.

In accordance with this invention it has been discovered that chloroform is a unique solvent for N,N'-bis-ethyleneterephthalamide. It is the only practical solvent that is capable of dissolving more than 5% by weight of the compound and since it is also water immiscible, it can be employed to prepare the compound in the above-referred to multiphase process.

Table I shows the solubility of N,N'-bis-ethyleneterephthalamide in various commercially available solvents. It will be noted that chloroform is a unique solvent in that the other solvents do not dissolve the N,N'-bis-ethyleneterephthalamide in concentrations over 3% with the sole exception of dioxane. Dioxane of course suffers the disadvantage of not being suitable for use in the multiphase system which is the only known practical process for the preparation of this compound in a pure and stable form. It will be noted that other chlorinated solvents, such as methyl chloroform, carbon tetrachloride, perchloroethylene, and trichloroethylene, are not useful as a solvent for this compound.

TABLE I

| Solvent: | Percent by weight solubility [1] |
|---|---|
| Chloroform | 10 |
| Isopropyl alcohol | 0.25 |
| Heptane | 0.02 |
| Acetonitrile | 2.8 |
| Ethanol (absolute) | 0.5 |
| Dimethyl siloxane-tetramer | 0.04 |
| Tetrahydrofurane | 2.8 |
| Methyl isobutyl ketone | 1.6 |
| Acetone | 2.6 |
| Dioxane | 4.7 |
| Trichloroethylene | 1.2 |
| Carbon tetrachloride | 0.2 |
| Benzene | 1.5 |
| Perchloroethylene | 0.2 |
| Methyl chloroform | 0.8 |

[1] At 30° C. after 2 days' saturation time.

*Example*

This example illustrates the preparation of a N,N'-bis-ethyleneterephthalamide in a multiphase system of chloroform and water.

A 2000 ml. three necked flask was equipped with a stirrer, thermometer, condenser, and dropping funnel. To the flask was added 600 ml. of water, 55.2 grams (0.4 mole) $K_2CO_3$, and 18.0 grams of ethylenimine. The mixture was stirred and cooled to 10° C. and a solution of 40.6 grams (0.2 mole) of terephthaloyl dichloride in 400 ml. of chloroform was added dropwise with stirring and cooling in 60 minutes. The temperature was kept at 10–12° C. during the addition and then allowed to warm to room temperature while stirring an additional hour. The chloroform layer was separated, dried over a desiccant, filtered and evaporated to constant weight under vacuum. 42.5 grams of white solid N,N'-bis-ethyleneterephthalamide (M.P. 140–143° C.) were obtained, corresponding to a 98 percent yield. Upon analysis the product was found to contain 37.6% azirane ring.

The solution prior to evaporation was useful in the impregnation of porous materials such as textiles and paper products, especially in combination with active hydrogen containing materials, such as carboxyl-containing polyesters, sulfhydro-containing materials, polyamines, and amino-containing polyamides. For instance, paper saturated with this solution and a solution of diethylene glycol-adipic polyester having an acid number of 42 produced a paper having excellent flexibility at lower temperatures and stability at elevated temperatures.

I claim:

A chloroform solution containing at least 3 percent by weight of N,N'-bis-ethyleneterephthalamide.

References Cited in the file of this patent

UNITED STATES PATENTS 2,937,203    Fuller _____ May 17, 1960

OTHER REFERENCES

Bestian: Liebig's Annalen der Chemie, vol. 566 (1950), pages 210–214.